United States Patent [19]
Evans

[11] Patent Number: 5,452,999
[45] Date of Patent: Sep. 26, 1995

[54] TEMPERATURE REGULATING SYSTEM, METHOD AND APPARATUS

[76] Inventor: Rowland F. Evans, 25 Dunlin Drive, Featherstone, Staffordshire WV10 7TC, England

[21] Appl. No.: 50,409
[22] PCT Filed: Nov. 14, 1991
[86] PCT No.: PCT/GB91/02006
   § 371 Date: May 17, 1993
   § 102(e) Date: May 17, 1993
[87] PCT Pub. No.: WO92/08598
   PCT Pub. Date: May 29, 1992

[30] Foreign Application Priority Data
   Nov. 16, 1990 [GB] United Kingdom ............... 9025015
[51] Int. Cl.⁶ ......................... B28B 17/00; B29B 13/00
[52] U.S. Cl. .................... 425/144; 165/30; 236/46 F; 236/78 D
[58] Field of Search ..................... 236/78 D, 46 F; 165/30, 2; 425/144; 264/40.6

[56] References Cited
U.S. PATENT DOCUMENTS
4,354,812  10/1982  Wieder et al. ................... 425/144
4,902,454   2/1990  Steinbichler et al. ............. 425/144

FOREIGN PATENT DOCUMENTS
5222657  6/1977  Japan ..................... 425/144
0063740  6/1978  Japan ..................... 236/78 D

*Primary Examiner*—William E. Wayner
*Attorney, Agent, or Firm*—Albert O. Cota

[57] ABSTRACT

A temperature regulating system (preferably a cooling system) for a cyclic processor comprising a mould having at least one internal passageway for receiving temperature regulating fluid, preferably coolant water. Continuous fluid flow will overcool the mould, and so the system normally is set to provide flow only for a part of the cycle, the proportion depending on mould temperature (or of fluid exhaust temperature) from a previous cycle, preferably the immediately preceding cycle and with an averaged temperature over the cycle. Also disclosed is a processor fitted with the system, and a method of controlling the temperature of a fluid cooled processor.

16 Claims, 2 Drawing Sheets

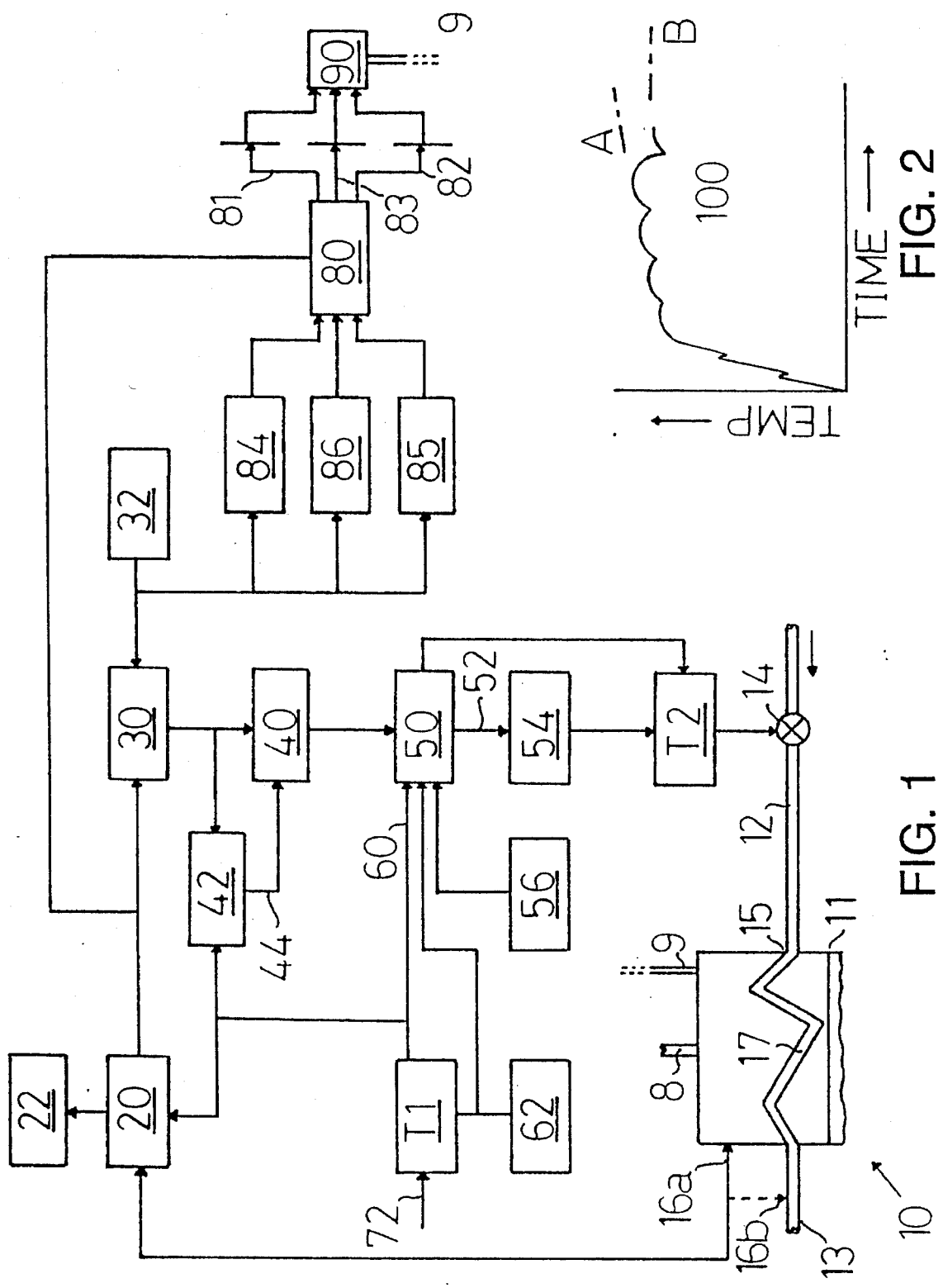

TEMPERATURE REGULATING SYSTEM, METHOD AND APPARATUS

FIELD OF THE INVENTION

This invention relates to a temperature regulating system, method and apparatus, and relates particularly to such system, method and apparatus for cyclic processors. Such processors typically have a pre-set repeating cycle time, and form standard products from a hot melt material which solidifies in a mould.

Although the system is likely to find most application utilising coolant flows to regulate against over-heating, we do not exclude systems utilising heating flows to regulate against over-cooling.

BACKGROUND TO THE INVENTION

Typical cyclic processors are injection moulding machines, blow moulding machines and aluminium die casting machines. For convenience the invention will be described in relation to thermoplastic injection moulding.

In thermoplastic injection moulding machines the hot melt material is introduced, typically injected, into a mould cavity, which cavity is then cooled in order that the material will solidify to form the product to a shape dictated by the mould cavity; the mould is thereafter opened, the formed product ejected, the mould closed to re-make the cavity, and the cycle repeated. For efficient working, the mould operating temperature must be held within an acceptable range defined by specified upper and lower temperature limits, since if the mould temperature is too high the material is slow to solidify, and if the mould temperature is too low some or all of the mould material can solidify in the injection sprue leading to the cavity i.e. premature solidification with a consequent increase in the required injection pump pressure. Furthermore it is considered good practice to maintain the mould within a temperature range which allows the product the minimum shrinkage and distortion during the setting or curing stage, both for product quality and for uniformity amongst the replications of the product being moulded.

The four variables which affect product quality are melt temperature, melt flow rate, melt pressure (each a function of the processor control systems and condition settings) and cooling rate. It is normal practice to seek to maintain product quality by repeated small adjustments of the processor machine controls, usually in response to external changes "outside" the machine controls. A reliable and accurate temperature regulating system is necessary so that the operating temperature, and therefore the cooling rate, can be held within a pre-determined range.

DISCLOSURE OF THE PRIOR ART

In one known mould cooling system a liquid is circulated continuously through channels fashioned in the walls of the mould. One disadvantage of this system is that by using continuously circulating liquid, the thermal mass of the system is large, so that the response time to temperature change is slow; also considerable skill is required on the part of the operator to set the correct external heat input or cooling rate for the liquid to maintain the mould within its working temperature range. The manual adjustment needs to be effected quickly and correctly if reject products are to be avoided.

In an alternative known continuous flow system, fluid is again continuously circulated through the mould, by way of a control system. The liquid temperature is less than that of the mould. If the temperature of the mould increases, the rate of water circulation is increased. This system has the disadvantages of the above known system, including that the mould temperature may vary due to ambient temperature changes, (with an unacceptable level of product rejects until the water circulation rate is manually changed), that the operator needs considerable skill to judge whether the rate needs to be increased or decreased and by how much, and that the mould is being cooled during charge injection, and even prior thereto. A U.S. Pat. No. 1,491,173 teaches that the temperature of a mould should be maintained within a constant range. Fluid preferably liquid, is caused to circulate (intermittently) through the coolant system as rapidly as the position of flow-control valves permit, the valves being automatically controlled thermostatically. The thermostatic means "includes any means which is governed by the temperature of the mould members or the fluid within the mould members automatically to operate the valves controlled the movement of the fluid element to carry of excess heat".

U.S. Pat. No. 3,583,456 discloses placing the temperature sensors, such as thermocouples, in a die assembly to sense the operating temperature in both the normally cold zone and in the normally hot zone of the die, with coolant flow being regulated to bring the zone temperatures as close together as possible. The temperature sensors are associated with indicating controller and signal means to provide a visible signal indicative of the desired operating temperature range.

General Electric publication "Electronic Experimenters Research Manual", Third Edition of 1971, teaches precision temperature regulation, including the use of a thermistor (temperature-sensitive resistor).

The temperature responsive means can be responsive to the temperature of the mould members and/or of the fluid within or exhausting from the mould members.

U.S. Pat. No. 4,902,454 teaches that after a predetermined nominal temperature has ben reached, the characteristics of a plastic injection moulding tool are tested by means of the temperature drop or temperature rise measured through gauging or calibration terms (cycles), or equal duration. Thus the relationship between the open and the closed time for the valve which controls (intermittent) coolant flow to the tool can be prescribed. If the temperature of the mould leaves a predetermined tolerance band the calibration cycles are repeated, and a different ratio of open/closed time is set for the valve.

U.S. Pat. No. 4,354,812 discloses another known arrangement, in which intermittent fluid cooling is used in accordance with the instantaneous temperature of the mould, with the flow being turned "on" when the temperature recorded rises above a preset value and "off" when the temperature recorded falls below a lower pre-set value. In a typical production embodiment the temperature of the mould adjacent the cavity is sensed by a probe; thus the probe is located in a probe well, which should extend close to the cavity to reduce the thermal lag time, but not so close as to weaken the cavity wall. The probe signal is monitored continuously.

Operating disadvantages of this known system are that there is a significant lag time before a cavity temperature outside the acceptable range is measured and responded to, so that the corrective "on" or "off" coolant flow though intended to be simultaneous with mould cavity temperature movements outside the pre-determined acceptable range also lags and so requires a correction, that the rate of heat transfer from the hot charge material through the mould wall to the probe can change if the position of the probe in the mould alters (for instance upon vibration as the mould opens and closes) so that the lag time can alter, and that the the sensor may respond to ambient temperature changes, heat spikes or heat troughs (i.e. sudden rises or falls in temperature respectively) to effect too early commencement of coolant flow (with partial solidification in the injection sprue) or too late commencement of coolant flow (with only partial solidification of the product before the mould is opened).

Facility disadvantages of this known system are that gateway circuits are required to distinguish between "high" temperatures which are above the upper pre-set temperature (so that coolant or extra coolant is required) and those which are above the lower temperature limit (so that the coolant valve is now to be closed or is to remain closed). Similarly, the gateway circuit must quickly distinguish throughout the cycle between "low" temperatures which are below the lower pre-set threshold requiring coolant valve closure, and those which are below the upper threshold, so that the coolant valve is opened (or is to remain open). Careful probe positioning is mandatory.

DISCLOSURE OF THE INVENTION

We have now realised that an intermittent coolant flow regime need not be directly dependent upon a scrutiny of the current mould temperature, but can instead and with advantage be made indirectly dependent on mould temperature as by using the "historic" average temperature of the mould (or of an equivalent or related parameter such as the exhaust temperature of the coolant) recorded during or over a previously completed cycle; or additionally or alternatively by arranging coolant flow in response to a temperature trend over a number of machine cycles.

The intermittent flow can be at a rate selected to ensure excess cooling, preferably with turbulent rather than laminar flow through the mould coolant passageway(s), so that the required cooling can be obtained by selecting the proportion of the cycle over which the coolant will flow, and by varying the proportion as necessary.

Furthermore, the optimum timing of the coolant flow can be selected in accordance with the known temperature curve of the mould e.g. with coolant flow when required always starting five seconds after mould closure, or with the required coolant volume for a long cycle time of perhaps ninety seconds being segmented into short flow periods to better hold the mould within the acceptable temperature range.

Other advantages of our system are that it no longer requires sophisticated instrumentation coupling the probe to the on-off valve for "direct instantaneous action", and that the probe location in the mould or fluid exhaust line is not critical.

Preferably the average temperature is calculated over each completed cycle from a succession of recorded temperature readings during that cycle, but in an alternative embodiment another mathematical derivative (e.g. root mean square value) can be used, and in a further but less preferred embodiment one or more temperature measurements over only a selected part of the machine or mould cycle are recorded or used.

We have also realised that the temperature measurements can themselves be recorded continuously as in the known system described above, but that the values to be summed can be taken therefrom at specified intervals; alternatively the sensor can itself average the temperature form the previous "inspection" i.e. over the interval until the next take-off of the reading, and so can achieve the accuracy of more delicate sensors whilst being better suited to a harsh environment.

We have further realised that a change in the coolant flow regime can be made dependent upon the change in the average mould or exhaust temperature either from cycle to cycle, or from the trend over several cycles, so that the system is difference-dependent. An advantage of this arrangement is that the system does not "hunt" (with fast repeated coolant valve actuation) if the mould temperature recorded by the probe hovers about one or other end of the pre-set temperature range, nor is the valve actuation required to react to short duration heat spikes or heat troughs which are not representative of the average cycle temperature.

We have further more realised that the coolant flow can be effected over a predetermined part only of a cycle, rather than randomly in direct (instantaneous) response to the high or low temperature sensor measurements. Specifically we can arrange the coolant regime so that there will be no coolant flow during material injection i.e. the material is not cooled whilst it is being injected, or whilst the majority of the material is being injected. The coolant flow is thereby concentrated in the period after injection, as the mould warms in response to the hot material input, and the mould temperature can thus be more closely controlled, as well as the coolant being more effectively used since it is circulated at the time it is most needed.

In a modified arrangement, the required coolant flow is arranged to occur as a number of "pulses", of a duration and spacing related to the cycle time. Thus this coolant regime is designed to avoid the problem of subsequent heat up of the mould after the specified coolant volume has been all utilised (as in a "single shot or pulse"), and which may be a problem with long cycle times.

SCOPE OF THE INVENTION

The scope of the invention is defined in the appended claims.

SPECIFIC EMBODIMENTS OF THE INVENTION

The invention will be further described with reference to the accompanying schematic drawings, in which:

FIG. 1 is a block diagram indicating the basic functional elements of the cyclic processor with a temperature control system according to the invention;

FIG. 2 is an illustrative graph showing typical temperature changes in a mould during successive injections of molten thermoplastics material;

The system and apparatus is described for FIGS. 1–2 in relation to one mould zone, although it will be understood that the system and apparatus can also be used to control a number of zones as in FIGS. 3–6, one ore more of which may be in the various separable sections which are joined to form a mould. Similar numbers are used for similar parts in the various figures.

Figure 3:
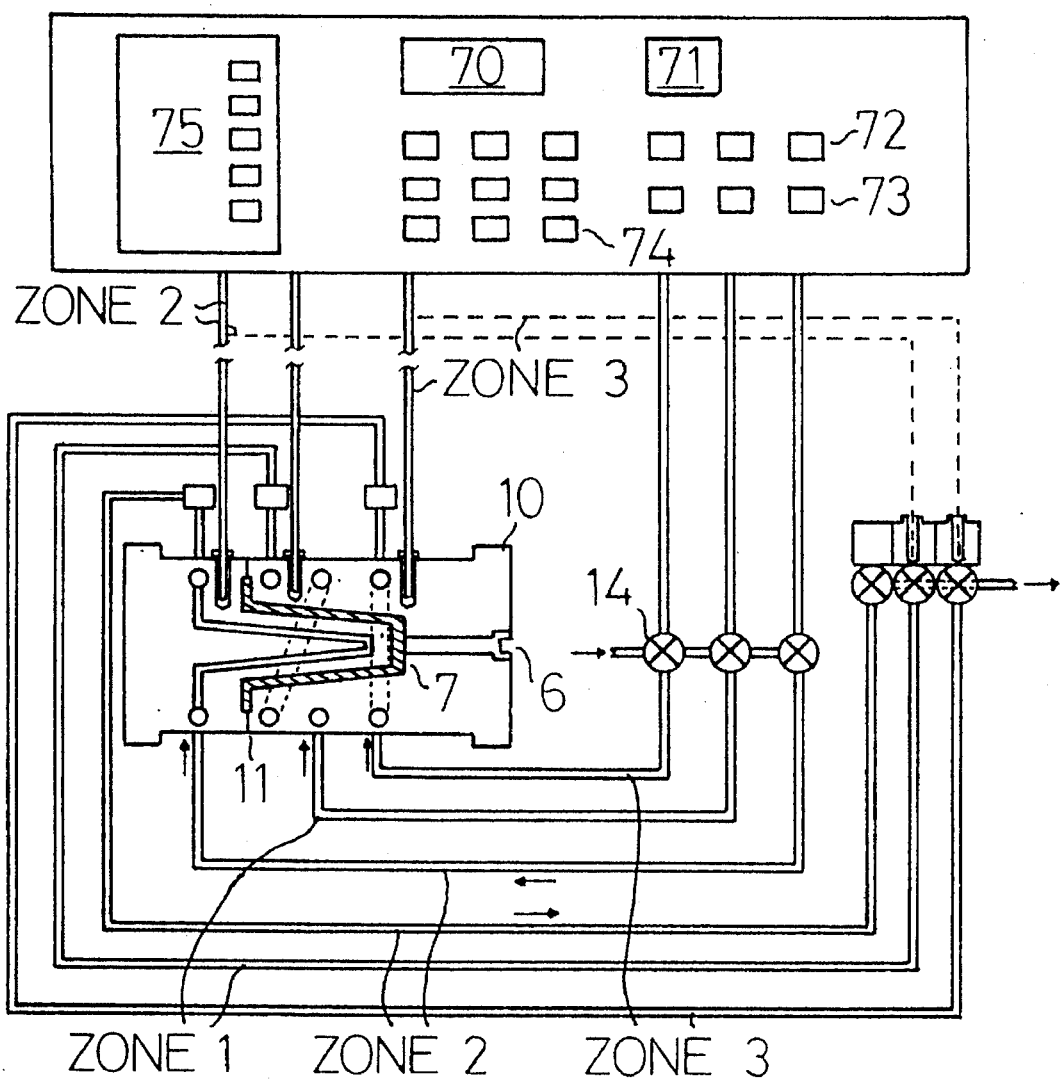
FIG. 3 is an illustrative drawing of a cyclic processor fitted with a three-zone control.
Figures 4, 5, 6:
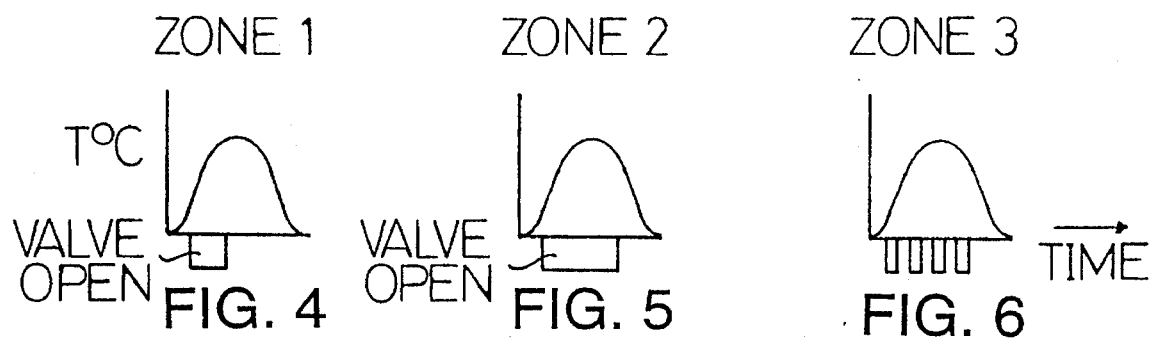
FIG. 4 is a graph of heat input to the mould during a cycle, from injected material, and the coolant time flow for zone 1 of the mould.
FIG. 5 is similar to FIG. 4, but for zone 2 of the mould.
FIG. 6 is similar to FIG. 4, but for zone 3 of the mould.

The mould 10 is part of a cyclic processor, in this embodiment used to form thermoplastic products in an internal mould cavity 7 (FIG. 3). The mold can be separated along split line 11 to allow ejection or withdrawal of the formed product. In use hot product liquid is fed to the mould cavity through conduit 8 and injection sprue 6.

The mould can be pre-heated to the operating temperature by electric current through wires 9, preferably powered from an adjustable power source and which are usefully disposed internally of the mould but which in an alternative embodiment are wrapped therearound. Subsequent to start-up, the current in wires 9 can be selected for extra heating to maintain the mould above the pre-set minimum operating temperature, for instance if the ambient environment suddenly becomes cooler or if flow of the hot thermoplastics liquid into the mould is interrupted. In an alternative embodiment the mould pre-heating, and the extra heating during moulding, can be effected by supplying pre-heated liquid to the mould, the heating passageways usually being different passageways from (but in specified embodiments the same as) those used for coolant circulation.

In a typical mould design suitable for continuous cyclic operation, the mould heat input 5 (FIG. 4) during a machine cycle introduced by injection of the hot product liquid is arranged to equal or be slightly greater than the mould maximum heat losses due to convection, conduction and radiation; thus forced cooling is needed to ensure that the mould does not overheat, particularly when the convection, conduction and radiation heat losses are at a minimum.

In the single zone embodiment of FIG. 1, mould 10 can be cooled by coolant flow through conduit 12 and which therefore provides a fluid supply means. In use, "on-off" valve 14 controls the supply of coolant from the supply means 12 to the connection means 15 and internal passageway 17 and thus to exhaust 13. In this embodiment the coolant is water at ambient temperature, but in an alternative embodiment is pre-cooled to below ambient temperature, and in another is pre-warmed above ambient.

Valve 14 is in either an open or a closed condition, as determined by timer T2; in this embodiment the valve carries its own driver, but the driver can be associated with or incorporated in a powered timer drive unit.

The temperature of either the mould 10 or of the exhaust coolant in conduit 13 is measured respectively by a sensor 16a or 16b at set intervals during each cycle. These temperatures are summed and an average cycle temperature obtained by means of calculator 20, which divides the summed value by the number of inputs; in an alternative embodiment the RMS (root mean square) temperature or other derivative indicative temperature is obtained, and this can be shown on a display 22. Sensor 16a or 16b typically is a thermocouple, resistance thermometer or thermistor probe, with associated known circuitry to produce a signal representative of the instantaneous mould temperature.

The output from calculator 20 is transmitted to comparator or error difference meter 30, which also has an input from datum temperature unit 32. Meter 30 is responsive to the difference between the inputs from calculator 20 and datum temperature unit 32. Datum unit 32 can be manually adjusted to a predetermined temperature setting, which can be changed for different operating conditions, and different injected materials.

The difference signal from comparator 30 is fed to comparator 40, and also to memory 42. If this difference signal, analogue or digital, is greater than a preset threshold value (as is most likely at start up or after an interruption), the signal (or a corresponding derived signal) is fed directly by comparator 40 to mode generator 50.

If however, the difference signal is less than the threshold value (as is most likely during normal running) it is not accepted by comparator 40. Thus comparator 40 is used to insert a "dead range", to help prevent the system "hunting" in response to every difference signal. It will be understood that the complex interaction between the mould normal heat losses and the heat input from the product material might itself lead to a mould temperature correction without need for two corrective changes to valve 14; excessive valve 14 wear is avoided.

The system can always respond to a trend (increase or decrease) in the difference between three or more successive difference signals, to apply a necessary temperature correction; such correction will usually be a "gentler" correction, with valve 14 being switched to and from "open" or "closed" for a smaller time variation. Thus in this embodiment, comparator 40 addresses memory 42 to seek the last three difference signals recorded by difference unit 30, though in an alternative embodiment a different number of memory signals in memory 42 can be addressed. If the memory signals show a consistent trend, i.e. an increasing or decreasing difference form one cycle to the next, then an instruction signal is generated by comparator 40 and sent to mode generator 50; however, if the signals from memory 42 do not show a consistent trend, for instance being successively greater and smaller, no memory-originating signal is generated by comparator 40.

If difference meter 30 is not fitted or is inoperative, the memory unit receives signals directly from calculator 20, with the system then only reacting to trend signals, after a delay to eliminate or ignore "start-up" temperature readings; the memory unit will issue a signal to comparator 40 based on a trend which averages readings from least two preceding cycles. If calculator 20 is omitted, the memory unit may receive individual temperature signals, including perhaps one from the present cycle e.g. if single readings at a specified cycle time are interrogated by memory unit 42. The memory unit 42 thus interposes a delay before the control signal is issued for valve alteration.

Mode generator 50 is therefore activated if there is an above threshold difference signal from difference unit 30, or if there is a trend signal from memory 42. Unless mode generator 50 is activated, no signal is transmitted to initiating unit 54, so that the coolant regime for mould 10 is unchanged. If however mode generator 50 is activated, a signal is despatched by line 52, by way of initiating unit 54, to timer T2 to alter the duration of the open condition of valve 14.

In this embodiment, the valve opening signal from timer T2 is timed with respect to a particular stage of a cycle by mode generator 50, with the signal from line 52 varying the "duration before change" or closure time set in unit 54, and thus the period during which the valve 14 remains open.

In the normal arrangement, valve 14 will remain open continuously for the specified period, during a single cycle. However, in an alternative embodiment, the required valve open period can be divided into a plurality of open periods, so as better to encompass the duration of the cycle. This alternative may be particularly appropriate for the longer cycles, typically of up to 300 seconds, and for which a single coolant shot or flow may not be best suited because of initial overcooling the mould and subsequent over-heating. For coolant flow division, the mode select unit 56 can be pre-set manually or automatically to divide the period of the valve opening 14 into a plurality of equal (or disparate) open-closed periods, for example three equal-time open periods or five equal-time open periods during each cycle, with intervening valve closed periods.

As described above, mode generator 50 controls the timing of the first opening of valve 14 during a particular cycle, so that valve 14 is only opened for instance after the hot material has been injected or mostly injected into mould 10. The initiating unit 54 needs to be re-set or triggered every cycle, to prevent drift in the opening time of valve 14 over a series of cycles i.e. a change in the duration from cycle commencement to coolant valve opening. Thus mode generator 50 receives a cycle time repeat-interval pulse through line 60 from repeat cycle timer T1. In one embodiment, the re-setting or triggering of timer T2 is repeated every 14 seconds, corresponding to the cycle time of T1, set on the manual set point indicator 62 to correspond to the mould 10 automatic timing cycle.

In an alternative arrangement, to cater for changes in the repeat interval, for instance if the moulding machine is manually cycled, or its operating arrangement is subject to fluctuations in the electrical supply, timer T1 can inspect a signal form an external source which it receives by way of line 72, for instance an externally generated sychronising trigger signal; this trigger signal may be derived directly from closure movement of the mould, or from pressure generation at the pump feeding the hot (liquid) product material, or from the machine control system.

Timer T1 defines for mode generator 50, memory unit 42 and calculator 20 each completed cycle, to permit proper calculation of the respective error differences and average cycle temperatures, and prompts mode generator 50 to trigger timer T2 for initial opening for that cycle of valve 14.

We also provide a comparator 80 with a first output line 81 to a "high temperature" alarm indicator, and a second output line 82 to a "low temperature" alarm indicator. To permit a simple check that comparator 80 is operative, we also provide an output line 83 which energises a "normal" indicator, for mould temperatures within an acceptable range. As one example, if for any reason valve 14 jammed in the closed condition, and did not respond to the consequent difference-signals from comparator 40 as mould 10 overheated, a visual or audible warning to the machine operator would be given by the "high temperature" alarm from a signal through line 81, and/or this signal could act to shut down the machine.

In this embodiment, comparator 80 compares the input derived from the average temperature generator 20 with upper and lower preset values from respective input units 84, 85; a normal temperature or temperature range is pre-set in unit 86. The actual pre-set values will be altered in conjunction with an alteration to set point indicator 32.

The variable heater control 90 responds to inputs from output lines 81,82,83 or the associated indicators, to adjust the electrical current in wiring 9, leading to mould 10. Greater current will be fed to mould 10 if there is for instance a significant drop in the ambient temperature, perhaps to such a degree that timer T2 is not required i.e. the heat input from the hot thermoplastic material is insufficient to counter environmental losses. A high electrical current is also used for mould pre-heating on start-up, instead of injected material.

The current through wires 9 can be of a constant amperage, but for variable periods, or the current can flow for preset periods but be of variable amperage.

The mould for which the graph of FIG. 2 is representative has no pre-heating, so that the injection flows for the first few start-up cycles from cold are used only to heat up the mould to operating temperature and the formed products are rejected. Subsequently cooling is effected, and the instantaneous temperature of the respective part of the mould repeats during each cycle in a common pattern; if however the average temperature shows a consistent rise over a pre-set number of cycles e.g. three, so that a rise indicated by line "A" ensues, then the valve 14 is opened at the predetermined stage in the cycle, and for either a pre-set time or a time dependent on the rate of "average cycle temperature" rise, whereby the next cycle 100 with concurrent coolant flow, has lower instantaneous temperatures and thus a lower average temperature, bringing the average closer to the ideal line "B".

Thus the system of the invention provides for effective and efficient timing of coolant flow through the mould during each cycle, to extract the excess process heat (from cooling of the hot product material); and also allows for minor environmental changes from cycle to cycle (e.g. slight ambient cooling if a door is opened) without the need for valve 14 opening time period to be altered. Thus we have recognised that small temperature fluctuations will be evened out by the thermal mass and inertia of the system, so that only cumulative change either positive or negative need to be identified and responded to, with the potential for a simplified and robust system, suited to the control of cyclic processors subject to repeated thermal stressing.

As also indicated in FIG. 3, it is common for moulds of the type described to have at least two separable sections, each section forming part of the cavity into which the thermoplastic material is injected. Furthermore, each section may have more than one zone, these zones each requiring a different operating temperature regime for optimum moulding, as is more particularly seen in FIGS. 4–6. Thus the coolant flow (if required) starts a specified time after hot liquid injection, and continues longer for zones 2,3 (core and hot runners respectively) than for zone 1 (cavity); the pulsed flow to zone 3 is segmented.

Shown dotted on FIG. 3 are the temperature sensors for zones 2,3 fitted in the return water manifold. A calculated temperature obtained from comparator 20 of a part of a zone of mould 10 is shown at indicator 70, and the units (Celsius or Fahrenheit) at 71; the respective zone is indicated at 72. The valve state (on,off) for each respective zone is shown at 73. The zone respective zone temperature condition (high, normal, low) is visually indicated at 74. Panel 75 is a keyboard for setting the desired temperatures.

One system constructed and operated according to the invention may be used to control a number of valves, each vale regulating coolant flow to a respective mould zone; in an alternative system the signals from the temperature sensor 16a,16b can be "sliced" into time segments, with signals from one or more other moulds or mould zones fitting in the time spaces therebetween, so that the microprocessor comprising components 20 to 90 of FIG. 1 separately processes signals to a plurality of timers T2, on a mark-space basis so that differing instructions can be given from each time segment.

We have also disclosed a cyclic processor with a cooling system designed to over-cool the part, in which the cooling system is pulsed and made to complement the hot material injection (to permit "set and forget"), in which the mould is the largest "restriction" to coolant flow in the system (valve fully open), and which utilises a "feed back" loop from the mould to vary the fluid received by the internal coolant passageway of the mould.

Although we prefer to vary the fluid received by the passageway by altering the duration of full fluid flow (valve fully open), since full fluid flow reduces the thermal gradient across the mould, we do not exclude alternatively or in addition altering the rate of fluid flow, or altering the fluid to one of different temperature or composition whereby to permit a different heat take up from the mould by the same volume of fluid, for instance water at one of 5,15,25 degrees Celcius. Thus valve 14 can be a four position valve (off,5, 15,25 positions); or three "on-off" valves can connect to an inlet manifold.

We prefer to control the flow of fluid to the passageway(s) upstream of the mould, with in the preferred embodiment the fluid being allowed to dwell in the mould before all or some is expelled to exhaust be the next fluid shot, in accordance with the fluid volume of that shot. Usefully the mould fluid exhaust is at a height above that of the mould fluid inlet. In an alternative embodiment fluid dwelling in the mould is caused to exhaust (or allowed to exhaust under gravity) upon opening of one or more downstream valves whereby to allow a corresponding volume of fresh temperature regulating fluid to enter the passageway, to fill the passageway; the valve will be opened for a period determined from one or more earlier cycles as above described.

I claim:

1. A temperature regulating system for a cyclic processor which includes temperature responsive means and temperature control means, characterized by timing means to effect operation of the control means, and by mode generating means to effect operation of the timing means, the mode generating means being adapted to act in response to a signal derived during a previous cycle from the temperature responsive means, a signal being derived during each of predetermined cycles of the processor.

2. A temperature regulating system for a cyclic processor comprising a mould having at least one internal passageway for receiving temperature regulating fluid which includes temperature responsive means to provide during a cycle a signal indicative of the temperature of at least part of the mould, and control means to vary the fluid received by the passageway, characterized by timing means to effect the control means at a predetermined time after the start of the cycle, and by mode generating means to effect operation of the timing means in response to a signal derived before said predetermined time from the temperature responsive means.

3. A temperature regulating system for a cyclic processor which includes temperature responsive means and temperature control means, characterized by timing means to effect operation of the control means, and by mode generating means to effect operation of the timing means, the mode generating means acting in response to the signal derived during a previous cycle from the temperature responsive means, wherein the temperature responsive means monitors the temperature of one of a mould body part and the exhaust fluid, and by controlling signal delay means adapted to average the signals from the temperature responsive means throughout a mould cycle.

4. The temperature regulating system according to claim 2 characterized in that the temperature responsive means monitors the temperature of one of a mould body part and the exhaust fluid, and by controlling signal delay means adapted to average the signals from the temperature responsive means throughout a mould cycle.

5. The temperature regulating system according to claim 3 characterized by a cycle timer connected to the controlling signal delay means to define the start and finish of a fluid supply cycle, and further characterized by means to adjust the cycle timer so that the fluid supply cycle will be of the same duration as an associated mould cycle.

6. The temperature regulating system according to claim 3 characterized by a difference indicator between the controlling signal delay means and the valve drive means, the difference indicator being adapted to issue an error signal responsive to the difference between signals representing the said average temperature and a base temperature, and by separate means connecting a comparator both directly to the difference indicator and indirectly to the difference indicator by way of a memory unit, the comparator being arranged to issue a control signal if the error signal is above or below a predetermined threshold value or if at least three successive error signals received by way of the memory unit indicate a signal trend.

7. The temperature regulating system according to claim 6 characterized by a difference indicator between the controlling signal delay means and the valve drive means, the difference indicator being adapted to issue an error signal responsive to the difference between signals representing the said average temperature and a base temperature, and by separate means connecting a comparator both directly to the difference indicator and indirectly to the difference indicator by way of a memory unit, the comparator being arranged to issue a control signal if the error signal is above or below a predetermined threshold value or if at least three successive error signals received by way of the memory unit indicate a signal trend.

8. The temperature regulating system according to claim 6 characterized by a mode generator connected to the comparator and to the cycle timer, the mode generator setting the proportion of the cycle time which is to be effective for fluid flow in the passageway in accordance with the value and sign of the control signal, the mode generator being arranged to issue an operational signal responsive to that proportion.

9. The temperature regulating system according to claim 8 characterized by a mode select unit connected to the mode generator, the mode select unit being adapted to effect division of the operational signal into preselected segments.

10. The temperature regulating system according to claim 9 characterized in that the valve drive means is connected to the fluid supply cycle timer and to the mode generator, the fluid supply cycle timer providing a start signal to initiate any variation in the valve means and the mode generator a duration signal to determine the duration of the variation.

11. A machine which includes a plastic injection mould having a conduction circuit for circulation of coolant, a coolant inflow duct and a coolant discharge duct connected to the conduction circuit, one of the inflow and discharge ducts including at least one valve having an open state allowing a preset maximum volumetric rate of flow of coolant and a closed state in which there is a minimum volumetric rate of flow of the coolant, a temperature sensor for sensing the temperature of part of the mould, a repeat cycle timer to determine the start time of an injection cycle and the start time of said open state, and a timer responsive to a signal derived from the temperature sensor to determine the period the valve remains in the open state during said injection cycle.

12. A machine according to claim 11 in which the repeat cycle timer is responsive to one of a machine generated synchronizing trigger signal and a manual set point indicator.

13. A machine according to claim 11 in which a driver operates the timer to move the valve into the open state more than once during a cycle.

14. A machine according to claim 11 in which the temperature sensor is locate din a conduit connected to the discharge duct.

15. A method for use with a machine which includes a plastic injection mould having a conduction circuit for circulation of coolant, a coolant inflow duct and a collant discharge duct connected to the conduction circuit, one of the inflow and discharge ducts including at least one valve having an open state allowing a preset maximum volumetric rate of flow of coolant and a closed state in which there is a minimum volumetric rate of flow of the coolant, a temperature sensor for sensing the temperature of one of a part of the mould and a coolant in the discharge duct, a repeat cycle timer to determine the start time of an injection cycle and the start time of said open state, and a timer responsive to a signal derived from the temperature sensor to determine the period the valve remains in the open state during said injection cycle, the method comprising the steps of: continuously performing working cycles including closing the plastic injection mould, injecting the mould with plastic material and opening the mould; continuously measuring the said temperature; starting mould cooling by opening the valve a set time after closing the mould; and holding the valve open for a time period which is a function of signals derived from the temperature sensor during successive working cycles and which exhibit a trend.

16. A method as claimed in claim 15 characterised by heating the mould during a cycle for part of the time said valve is in the closed state.

* * * * *